US010713616B2

(12) United States Patent
Spruell et al.

(10) Patent No.: US 10,713,616 B2
(45) Date of Patent: *Jul. 14, 2020

(54) DETERMINING A REMAINING AMOUNT OF MATERIAL IN A MATERIAL PACKAGE

(71) Applicant: Southwire Company, LLC, Carrollton, GA (US)

(72) Inventors: Stephen Lee Spruell, Carrollton, GA (US); Charles A. Murrah, Jr., Carrollton, GA (US); Carter Edward Smith, Carrollton, GA (US)

(73) Assignee: SOUTHWIRE COMPANY, LLC, Carrollton, GA (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/715,275

(22) Filed: Sep. 26, 2017

(65) Prior Publication Data

US 2018/0018625 A1 Jan. 18, 2018

Related U.S. Application Data

(63) Continuation-in-part of application No. 15/188,012, filed on Jun. 21, 2016, now Pat. No. 10,535,038.

(Continued)

(51) Int. Cl.
*G06Q 10/08* (2012.01)
*G06K 19/06* (2006.01)
(Continued)

(52) U.S. Cl.
CPC ......... *G06Q 10/087* (2013.01); *B65H 75/182* (2013.01); *G06F 16/245* (2019.01);
(Continued)

(58) Field of Classification Search
None
See application file for complete search history.

(56) References Cited

U.S. PATENT DOCUMENTS 3,964,605 A * 6/1976 Vezirian ............... B65D 75/004
206/349
3,985,937 A 10/1976 Fife
(Continued)

FOREIGN PATENT DOCUMENTS

CN 205882648 U 1/2017
DE 10036638 A1 5/2001
(Continued)

OTHER PUBLICATIONS

International Search Report dated Aug. 25, 2016 cited in Application No. PCT/US2016/038553, 10 pgs.
(Continued)

*Primary Examiner* — Nathan C Uber
*Assistant Examiner* — Denisse Y Ortiz Roman
(74) *Attorney, Agent, or Firm* — Merchant & Gould P.C.

(57) ABSTRACT

It may be determined that a material package has been used by determining that the material package has moved from a previously recorded location based upon location data corresponding to the material package and a beacon code. The location data may correspond to the material package and the beacon code being periodically reported by a beacon located proximate to the material package. Next, a weight of the material package that has been used subsequent to the material package being used may be received and, based upon the beacon code and in response to receiving the weight of the material package; the material database for a material package record may be queried. A remaining amount of material corresponding to the material package may be calculated based upon the received weight and data from the material package record found from the material package record.

21 Claims, 6 Drawing Sheets

Related U.S. Application Data

(60) Provisional application No. 62/302,925, filed on Mar. 3, 2016, provisional application No. 62/261,338, filed on Dec. 1, 2015, provisional application No. 62/182,709, filed on Jun. 22, 2015.

(51) Int. Cl.

| | | |
|---|---|---|
| *G08B 21/02* | (2006.01) | |
| *G08B 13/24* | (2006.01) | |
| *B65H 75/18* | (2006.01) | |
| *G06Q 10/06* | (2012.01) | |
| *G06F 16/245* | (2019.01) | |
| *G06F 16/2455* | (2019.01) | |
| *H04W 4/02* | (2018.01) | |

(52) U.S. Cl.
CPC ... *G06F 16/2455* (2019.01); *G06K 19/06028* (2013.01); *G06Q 10/06315* (2013.01); *G08B 13/248* (2013.01); *G08B 21/0275* (2013.01); *H04W 4/023* (2013.01)

(56) References Cited

U.S. PATENT DOCUMENTS

| | | | |
|---|---|---|---|
| 4,458,360 A | 7/1984 | Venäläinen et al. | |
| 5,139,209 A | 8/1992 | Kramer | |
| 5,564,199 A * | 10/1996 | Yamamoto | B27D 3/02 |
| | | | 100/196 |
| 6,352,215 B1 * | 3/2002 | Cash | B21C 47/30 |
| | | | 242/574.2 |
| 6,391,357 B1 | 5/2002 | Muise et al. | |
| 8,584,942 B1 | 11/2013 | Rayes et al. | |
| 9,851,989 B2 | 12/2017 | Muller et al. | |
| 2002/0067265 A1 | 6/2002 | Rudolph | |
| 2003/0233293 A1 | 12/2003 | Hsu et al. | |
| 2004/0219398 A1 * | 11/2004 | Calhoon | H01M 8/04089 |
| | | | 429/406 |
| 2006/0100970 A1 | 5/2006 | Morony | |
| 2009/0045915 A1 | 2/2009 | Kennedy | |
| 2010/0019905 A1 * | 1/2010 | Boddie | G06Q 10/087 |
| | | | 340/572.1 |
| 2011/0285506 A1 | 11/2011 | Hillis | |
| 2015/0130593 A1 | 5/2015 | Mats et al. | |
| 2016/0260053 A1 | 9/2016 | Barron et al. | |
| 2016/0371637 A1 | 12/2016 | Spruell et al. | |

FOREIGN PATENT DOCUMENTS

| | | |
|---|---|---|
| DE | 102012020768 A1 | 4/2014 |
| GB | 2190498 A1 | 11/1987 |
| JP | 2006127896 | 5/2006 |
| WO | 2004013731 A2 | 2/2004 |
| WO | 2016140789 A1 | 9/2016 |

OTHER PUBLICATIONS

International Search Report dated May 25, 2016 cited in International Application No. PCT/US2016/017569, which is attached to International Publication No. WO 2016/140789 A1 published on Sep. 9, 2016, 2 pgs.

Quabbin Wire & Cable Co., Inc., "A Method to Calculate the Capacity of a Reel or Spool," 2014-2017, 3 pgs., https://www.quabbin.com/tech-briefs/method-calculate-capacity-reel-or-spool.

\* cited by examiner

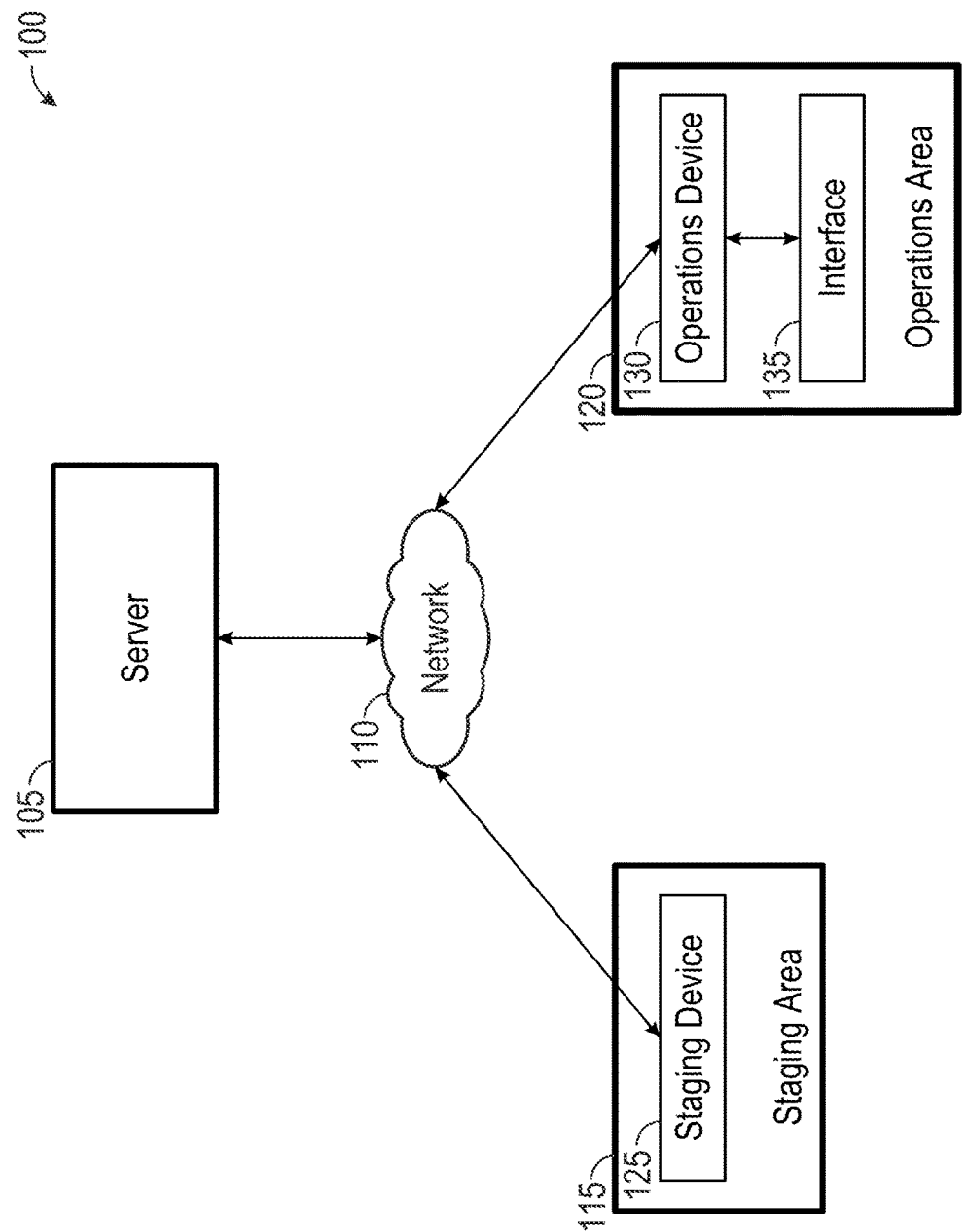

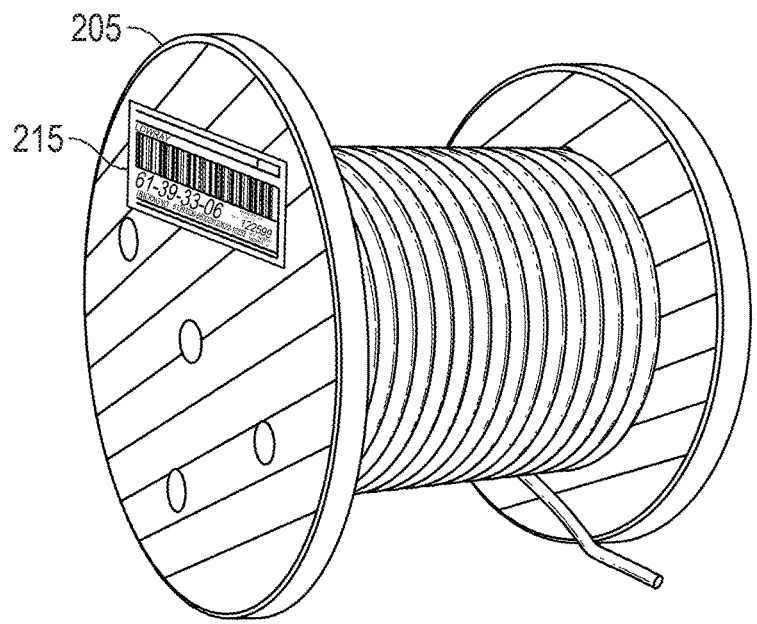
FIG. 2A
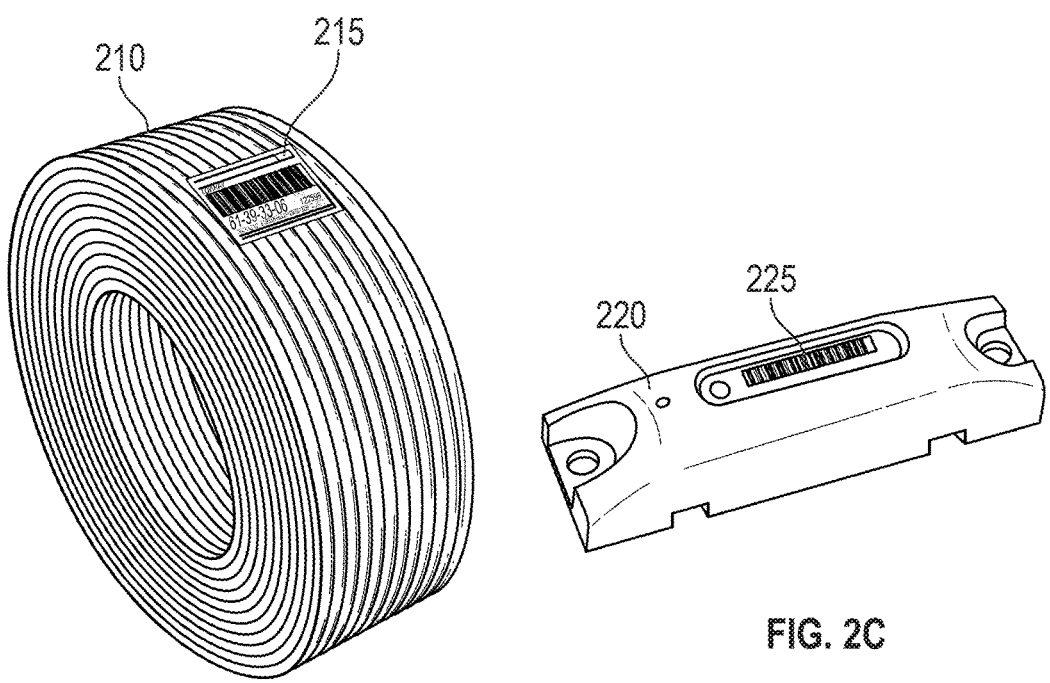
FIG. 2B
FIG. 2C

DETERMINING A REMAINING AMOUNT OF MATERIAL IN A MATERIAL PACKAGE

RELATED APPLICATIONS

This application is a Continuation-in-part of U.S. application Ser. No. 15/188,012 entitled "Determining a Remaining Amount of Material in a Material Package," filed Jun. 21, 2016, which is incorporated herein by reference, which claims the benefit under provisions of 35 U.S.C. § 119(e) of U.S. Provisional Application No. 62/302,925 filed Mar. 3, 2016, U.S. Provisional Application No. 62/261,338 filed Dec. 1, 2015, and U.S. Provisional Application No. 62/182,709 filed Jun. 22, 2015, which are also incorporated herein by reference.

BACKGROUND

Just-in-time (JIT) manufacturing, also known as just-in-time production, is a methodology aimed primarily at reducing flow times within production as well as response times from suppliers and to customers. JITR manufacturing may use radio-frequency identification (RFID). RFID is the wireless use of electromagnetic fields to transfer data, for the purposes of automatically identifying and tracking tags attached to objects. The RFID tag can be affixed to an object and used to track and manage inventory, assets, people, etc. For example, it can be affixed to cars, computer equipment, books, mobile phones, etc.

RFID provides a way for organizations to identify and manage tools and equipment (asset tracking), without manual data entry. RFID is being adopted for item level tagging in retail stores. This provides electronic article surveillance (EAS) and a self-checkout process for consumers. Automatic identification with RFID can be used for inventory systems. Manufactured products such as automobiles or garments can be tracked through the factory and through shipping to the customer.

BRIEF DESCRIPTION OF THE FIGURES

The accompanying drawings, which are incorporated in and constitute a part of this disclosure, illustrate various embodiments of the present disclosure. In the drawings:

FIG. 1 is a block diagram of an operating environment for determining a remaining amount of material in a material package in accordance with at least one example embodiment;

FIG. 2A shows a material package in accordance with at least one example embodiment;

FIG. 2B shows a material package in accordance with at least one example embodiment;

FIG. 2C shows a beacon in accordance with at least one example embodiment;

DETAILED DESCRIPTION

Overview

Figure 3:
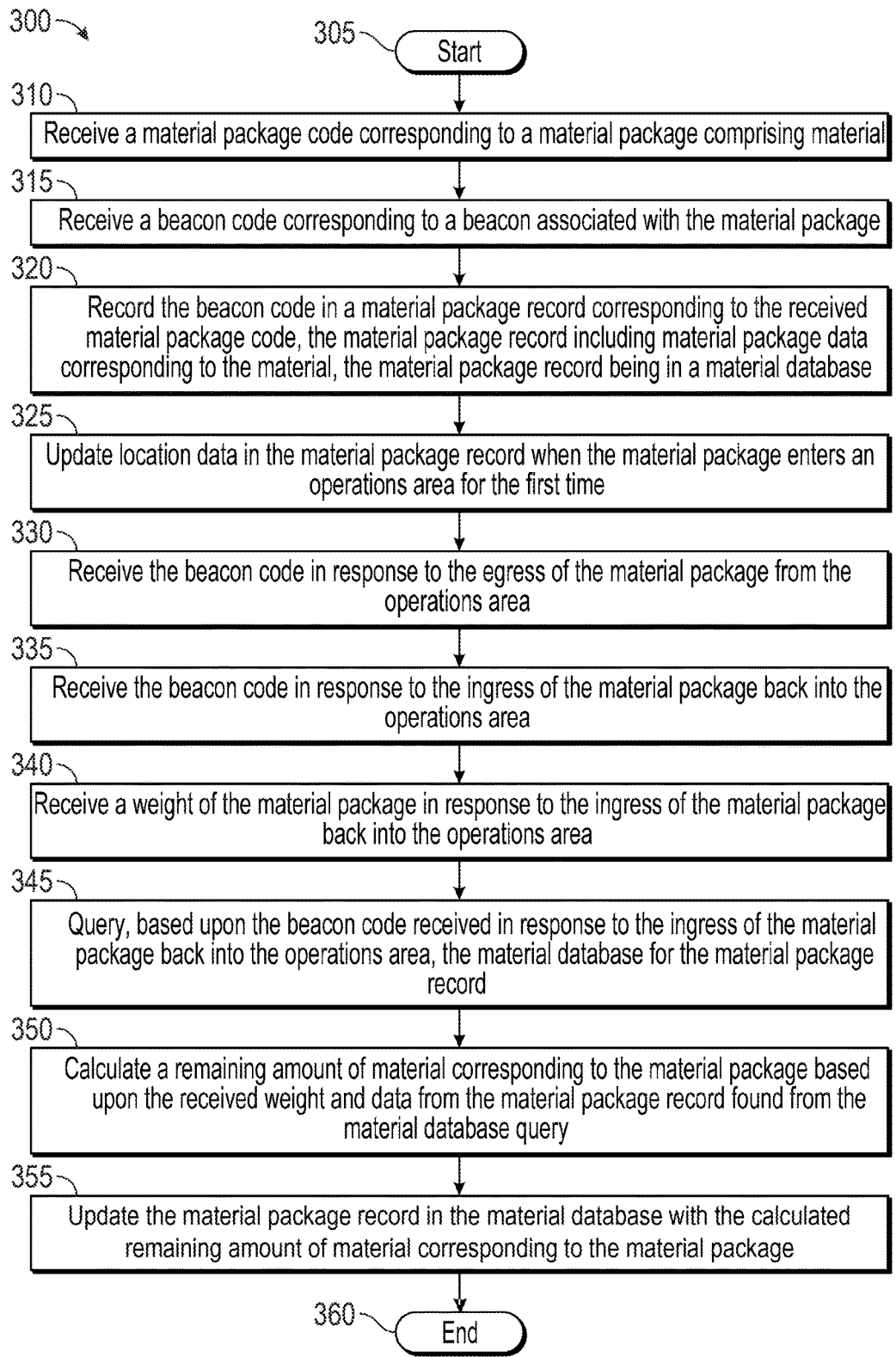
FIG. 3 is a flow chart of a method for determining a remaining amount of material in a material package in accordance with at least one example embodiment.

Determining a remaining amount of material in a material package may be provided. First, it may be determined that the material package has been used by determining that the material package has moved from a previously recorded location based upon location data corresponding to the material package and a beacon code. The location data may correspond to the material package and the beacon code being periodically reported by a beacon located proximate to the material package. Next, a weight of the material package that has been used subsequent to the material package being used may be received and, based upon the beacon code and in response to receiving the weight of the material package; the material database for a material package record may be queried. A remaining amount of material corresponding to the material package may be calculated based upon the received weight and data from the material package record found from the material package record query.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Consistent with embodiments of the disclosure, beacons may be applied to material packages (e.g., wire reels) at a manufacture's staging area. Barcode scanner may then read and associate reel tags from the wire reels and the applied beacons from the wire reels. Data may be written to the beacons' memory and a cloud database. Reel-less package beacons may be zip tied onto an inside tail of the wire or cable for example. Wooden reels may have beacons placed inside one of the holes predrilled into the reel's inner drum. A scanner may be used to scan a reel tag barcode and read the beacon barcode. As an alternative, an RFID (e.g., an active RFID) chip on the beacon may be scanned with a barcode-UHF reader.

From the manufacture's staging area, material packages may be unloaded at a utility's location (e.g., an operations area) and may be automatically logged into the cloud database with the new location. The material packages may be read by a Wi-Fi network that may cover the entire operations area. Updated location and automated receipt of material data may be sent to the cloud database.

As material packages leave and return to the operations area on service trucks, UHF antennae scanners may read the beacon to log the events. The Wi-Fi network may provide duplicate reads. Material packages may be weighed after return and remaining footage of material on the material packages may be automatically calculated. As will be described below, moisture content of the material packages may be considered when the remaining amount of material on the material packages is determined. This may be (but not limited to) the case when, for example, wooden reels are used as the material package. To obtain the weight, the material packages may be placed on outdoor scales with a forklift. The UHF antenna may read the beacon on the scale. A new footage may be calculated and written to both the beacon and the cloud database. Partial packages may be returned to the operations area for future use. Partial packages may be visible on the system through software on the server for day-to-day, outage, or storm response situations.

FIG. 1 is a block diagram of an operating environment 100 in accordance with embodiments of the disclosure. As shown in FIG. 1, operating environment 100 may comprise a server 105, a network 110, a staging area 115, and an operations area 120. Staging area 115 may include staging device 125. Operations area 120 area may include operations device 130 and interface 135. As will be described in greater detail below, staging area 115 may comprise a location where a material package may be staged for deliver to operations area 120.

FIG. 2A shows an example of a material package consistent with embodiments of the disclosure. As shown in FIG. 2A, the material package may comprise a wire reel 205 on which material may we wound. Wire reel 205 may be made of wood, metal, or any other material. The material on wire reel 205, for example, may comprise electrical cable, electrical wire, flexible conduit, or any other material capable of being wound on wire reel 205.

FIG. 2B shows an example of a material package consistent with embodiments of the disclosure. As shown in FIG. 2B, the material package may comprise a wire coil 210 in which the material may be wound. No reel may be present with wire coil 210. A wrapping material may be placed around wire coil 210. The material in wire coil 210, for example, may comprise electrical cable, electrical wire, flexible conduit, or any other material capable of being wound in wire coil 210.

A package label 215 may be placed on the material package (e.g., wire reel 205 or wire coil 210). Package label 215, for example, may include an optical machine-readable representation of data relating to the material package to which it is attached. The optical machine-readable representation may be readable by staging device 125. The optical machine-readable representation may comprise, but is not limited to, a one-dimensional (1D) bar code or a two-dimensional (2D) bar code. For example, package label 215 may comprise a material package code (i.e., optical machine-readable representation) that may either contain: i) material package data corresponding to the material; or ii) an index referencing the material package data corresponding to the material stored, for example, on server 105 or staging device 125.

The material package data may comprise, but is not limited to, a per unit weight of the material on the material package, weight of the material package prior to the material being placed on the material package, moisture content of the material package at a particular time (e.g., the time it was weighed prior to the material being placed on the material package), a "dry" weight of the material package prior to the material being placed on the material package, a manufacture date for the material, identification of a machine on which the material was made, an identification of an operator who operated the machine on which the material was made, identification of a machine on which the material was assembled and when, an identification of an operator who operated the machine on which the material was assembled and when, an identification of what plant made each component of the material, an identification of what plant that assembled the material, what lot number of raw material was used for the material, quality assurance and conformance data for all materials used to make the product, and how the material package was shipped.

The moisture content of the material package at the time it was weighed may comprise a percentage of the material package weight prior to the material being placed on the material package due to moisture in the material package. For example, the material package prior to the material being placed on the material package may be 120 lbs. and the moisture content (when this weight was taken) may be measured at 20%. In this case, the "dry" weight of the material package prior to the material being placed on the material package may comprise 100 lbs. (i.e., 100 lbs.=120 lbs./(1+0.20)). Similarly, the amount of moisture in the material package prior to the material being placed on the material package may be 20 lbs. (i.e., 20 lbs.=120 lbs.−100 lbs.).

As stated above, the material package data may comprise a per unit weight of the material on the material package. Consistent with embodiments of the disclosure, the per unit weight of the material may be a standard value that may be used and accepted as the per unit weight of the material. For example, the material may comprise an electrical cable comprising 1/0 ACSR Raven. A manufacturer of 1/0 ACSR Raven may publish that the per unit weight of such a cable is 0.145 lbs. per foot. Consequently, 0.145 lbs. per foot may be used in the material package data as the per unit weight of the material on the material package anytime the material comprises 1/0 ACSR Raven. As another example, a manufacturer of underground 4/0 Secondary Triplex Sweatbriar may publish that the per unit weight of such a cable is 0.709 lbs. per foot. Consequently, 0.709 lbs. per foot may be used in the material package data as the per unit weight of the material on the material package anytime the material comprises 4/0 Secondary Triplex Sweatbriar.

Consistent with other embodiments of the disclosure, the per unit weight of the material may be calculated on a package-by-package basis. For example, the manufacturer may know the weight of the material package prior to the material being placed on the material package. Also, the manufacturer may measure the amount of material that is being placed on the material package. In the case of a cable, the measured amount may be the length of the cable being placed on the material package. After the material is placed on the material package, the material package may be weighed, for example, at staging area 115, to obtain a weigh of the material package after the material is placed on the material package. The weight of the material placed on the material package may be calculated by subtracting the weight of the material package prior to the material being placed on the material package from the weight of the material package after the material is placed on the material package. The weight of the material placed on the package may be divided by the amount of material placed on the package to calculate a per unit weight of the material placed on the package. This may be done on a package-by-package basis.

For example, a material for a package my comprise 1/0 ACSR Raven. The weight of the material package prior to the material being placed on the material package may comprise 200.00 lbs. and the amount of material placed on the package may be 998.1 feet. After the amount of material is placed on the material package, the manufacturer may determine that the weight of the material package is 343.71 lbs. The weight of the material placed on the material package may be calculated by subtracting the weight of the material package prior to the material being placed on the material package (i.e., 200.00 lbs.) from the weight of the material package after the material is placed on the material package (i.e., 343.71 lbs.). In this example, the weight of the material placed on the material package may comprise 143.71 lbs. (i.e., 343.71 lbs.–200.00 lbs.). The weight of the material placed on the package may be divided by the amount of material placed on the package to calculate a per unit weight of the material placed on the package. In this example, the per unit weight of the material placed on the package may comprise 0.144 lbs. per foot (i.e., 143.71 lbs. divided by 998.1 feet). This package-by-package calculated per unit weight of the material may be used in the material package data that may go along with its respective package.

The material contained in the material package may comprise any type of material. For example, the material may comprise a continuous and/or homogeneous substance of which a portion may be taken from the material package and consumed. When a portion of the material is taken from the material package, the material remaining in the material package may still be the same; it's just that less of the material may remain in the material package when some of the material is removed from the material package. The material may comprise a longitudinally continuous substance that may be consumed by its length, for example, cable, wire, conduit, and the like. In other words, the material may comprise one long, continuous, flexible piece that may be wound in a coil or on a reel and then partially consumed by its length by cutting off a longitudinal portion of the material. The material may comprise a homogeneous substance, for example, a gas, liquid, solid (e.g., granular) substance for which the material package may comprise a tank or any other suitable container.

FIG. 2C shows a beacon 220. For example, beacon 220 may be placed anywhere on the inside or outside of wire reel 205 or wire coil 210. Regarding wire coil 210, beacon 220 may be attached (e.g., via zip tied) to the tail end of the material (e.g., wire or cable) in the coil of wire comprising wire coil 210. Beacon 220 may include a beacon label that may comprise an optical machine-readable representation of a beacon code unique to beacon 220.

Beacon 220 may also include a memory that may be read from wirelessly and written to wirelessly. For example, the aforementioned material package code may be written to beacon 220's memory. Furthermore, the initial amount of material in material package may be written to beacon 220's memory. As material is consumed from the material package, the remaining amount of material may be written to beacon 220's memory.

Beacon 220 may make wireless transmissions that may include its unique beacon code. Beacon 220 may also utilize the Global Positioning System (GPS) to obtain data indicating beacon 220's location and may include this data indicating beacon 220's location in the wireless transmissions. Beacon 220 may obtain its location data periodically or when it is pinged (e.g., by staging device 125 or operations device 130). Beacon 220 may store its location data in its memory. These transmissions may also include data corresponding to some or all of beacon 220's memory. Beacon 220 may make these wireless transmissions periodically or in response to being pinged (e.g., by staging device 125 or operations device 130). Beacon 220's transmissions may be encoded. Beacon 220, for example, may use active RFID or Bluetooth. Notwithstanding, wireless communications to and from beacon 220 may comprise any form of wireless communications including, but not limited to, Wi-Fi, Bluetooth, and RF. Beacon 220 may be placed on the material package.

FIG. 3 is a flow chart setting forth the general stages involved in a method 300 consistent with an embodiment of the disclosure for determining a remaining amount of material in a material package. Method 300 may be implemented using, for example, server 105, staging device 125, and operations device 130, each of which may be embodied in computing device 500 as described in more detail below with respect to FIG. 5. Ways to implement the stages of method 300 will be described in greater detail below.

Method 300 may begin at starting block 305 and proceed to stage 310 where server 105 may receive a material package code corresponding to a material package comprising material. For example, the material package (e.g., wire reel 205 or wire coil 210) may be manufactured by a manufacturer and placed in staging area 115 for shipment to operations area 120 maintained by a purchaser of the material package for example. The purchaser may comprise, but is not limited to, a utility company or contractor who may wish to consume the material.

An operator for the manufacture my use staging device 125 to obtain the material package code from the material package and transmit the material package code to server 105 over network 110. For example, staging device 125 may comprise a scanner capable of reading package label 215. The operator may use the scanner to read package label 215 to obtain the material package code and then transmit the material package code to sever 105. Package label 215 may be placed on the material package at any point during the manufacturing process. Server 105 may accordingly receive the material package code from the scanner operated by the operator.

From stage 310, where server 105 receives the material package code corresponding to the material package comprising the material, method 300 may advance to stage 315 where server 105 may receive a beacon code corresponding to a beacon associated with the material package. For example, beacon 220 may have been placed on the material package (e.g., wire reel 205 or wire coil 210). Beacon 220 may be placed on the material package at any point during the manufacturing process. The material database and the memory in beacon 220 may be updated when the material package is filled. Beacon 220 may include beacon label 225 that may comprise an optical machine-readable representation of the beacon code unique to beacon 220. Beacon 220 may also make wireless transmissions that may include its unique beacon code. The operator may use the scanner to read beacon label 225 or to receive the wireless transmission from beacon 220 to obtain the beacon code. The operator may use the scanner to then transmit the beacon code to sever 105. Server 105 may accordingly receive the beacon code from the scanner operated by the operator.

Once server 105 receives the beacon code corresponding to the beacon associated with the material package in stage 315, method 300 may continue to stage 320 where server 105 may record the beacon code in a material package record corresponding to the received material package code. The material package record may include the material package data corresponding to the material. The material package record may be in a material database. For example, the material package code may either contain: i) the material package data corresponding to the material; or ii) an index referencing the material package data corresponding to the material stored, for example, on server 105. If the material package code contains an index referencing the material package data corresponding to the material stored, for example, on server 105, then server 105 may look up the material package data corresponding to the received material package code. Now having both the beacon code and the material package data corresponding to the material on the material package, server 105 may create and record the beacon code in a material package record corresponding to the received material package code. The material package record for the material package may include: i) the beacon code for the beacon on the material package; and ii) the material package data corresponding to the material on the material package.

After server 105 records the beacon code in stage 320, method 300 may proceed to stage 325 where server 105 may update location data in the material package record when the material package enters operations area 120 for the first time. For example, the material package (e.g., wire reel 205 or wire coil 210) may be shipped from staging area 115 to operations area 120. Operations area 120 may be maintained by the purchaser of the material package. As the material package enters operations area 120, interface 135 may read beacon 220 for its beacon code. Interface 135 may transmit the beacon code to operations device 130. In turn, operations device 130 may report the read beacon code to server 105. In response, server 105 may update location data in the material package record. The updated location data may indicate that the material package is now located in operations area 120 and is no longer in staging area 115.

From stage 325, where server 105 updates the location data in the material package record, method 300 may advance to stage 330 where server 105 may receive the beacon code in response to the egress of the material package from operations area 120. For example, a crew working for the operator of operations area 120 may have a need for material located on the material package to perform a certain job. As a result, the crew may load the material package on a vehicle and drive the vehicle from operations area 120 in order to go and perform the job. As the material package leaves operations area 120, interface 135 may read the beacon code from beacon 220 located on the material package. In response, interface 135 may report this reading of the beacon code from beacon 220 to operations device 130 that may in turn report this to server 105. Consequently, server 105 (and operations device 130) may log the egress of the material package from operations area 120.

Once server 105 receives the beacon code in response to the egress of the material package in stage 330, method 300 may continue to stage 335 where server 105 may receive the beacon code in response to the ingress of the material package back into operations area 120. For example, the crew working for the operator of operations area 120 may have performed the job that needed the material from the material package. As a result of the completion of the job, the crew may return to operations area 120 with the material package. During the job, the crew may have taken a portion of the material from the material package in order to complete the job. As the material package reenters operations area 120, interface 135 may read the beacon code from beacon 220 located on the material package. In response, interface 135 may report this reading of the beacon code from beacon 220 to operations device 130 that may in turn report this to server 105. Consequently, server 105 (and operations device 130) may log the ingress of the material package back into operations area 120.

After server 105 receives the beacon code in response to the ingress of the material package in stage 335, method 300 may proceed to stage 340 where server 105 may receive a weight of the material package in response to the ingress of the material package back into the operations area. For example, because the material package is reentering operations area 120, a portion of the material may have been removed from the material package. Because the portion of the material may have been removed from the material package, it is desirable to know how much material remains on the material package. In order to determine how much material remains on the material package, a weight of the returned material package may be obtained and used to calculate the remaining material as described below. Another way to determine how much material remains on the material package may be for the crew to determine how much material they removed from the material package. The crew may use a mobile device to read the beacon code and send a value of the amount of material used to server 105 where the material package record may be updated based on the material used and the read beacon code.

The weight of the returned material package may be obtained in any way. For example, upon ingress of the material package back into operations area 120, the material package may be placed in a holding area for weighing. Once the material package has been weighed, the weight may be reported to operations device 130 that may in turn report the weight of the material package to server 105.

In addition to the weight of the material package, the moisture content of the returned material package may also be obtained and reported to server 105. For example, when the material package comprises a reel (e.g., a wooden reel), a moisture device (e.g., a moisture meter) may be used to obtain the moisture content of the reel. The moisture meter may comprise, but is not limited to, an L600 Series Digital Recording Handheld Moisture Meter provided by Wagner Meters of 326 Pine Grove Road, Rogue River, Oreg. 97537.

The moisture content of the reel may comprise a percent moisture value. Because the amount of moisture in the material package may fluctuate over time, the weight of the material package may not only change due to material being removed, but the weight of the material package may also change due to moisture being added or taken away from the material package. The moisture device may read the percentage of moisture in the material package (e.g., reel). One moisture percentage reading may be taken or several moisture percentage readings may be taken at different location on the material package and averaged.

Consistent with other embodiments of the disclosure, the moisture content value may be obtained in other ways. For example, a sample material (e.g., wood) being the same or similar to the material that the material package is made of may be kept in the same environment as the material packages in operations area 120. Rather than taking a moisture percentage reading from each material package, the moisture percentage reading of the sample may be used. Furthermore, historic moisture content values for material (e.g., wood) being the same or similar to the material that the material package is made of may be kept for operations area 120's environment. Rather than taking a moisture percentage reading of each material package, the moisture percentage historic values may be used instead. The historic values may be a function of weather and season for example. Furthermore, the moisture content value may be obtained by method 400 described below. Once the weight and the moisture content value are obtained, the material package may be placed in the general warehouse of operations area 120 for use on yet another job.

Consistent with embodiments of the disclosure, equipment (e.g., a fork truck) used to remove the material package from the vehicle for the return of the material package back into operations area 120 may have a device to weigh and read the moisture content of the material package and wirelessly report the weight and moisture content to interface 135. Consistent with other embodiments of the disclosure, the material package itself may include a device to weigh itself and report this weight to interface 135. Furthermore, the material package itself may include a device to obtain its own moisture content and report this reading to interface 135.

From stage 340, where server 105 receives the weight and the moisture content value of the material package, method 300 may advance to stage 345 where server 105 may query, based upon the beacon code received in response to the ingress of the material package back into operations area 120, the material database for the material package record. For example, server 105 may query the material database for the material package record to obtain the per unit weight of the material on the material package, the previous weight of the material package before the job, and the moisture content of the material package when the previous weight was taken of the material package before the job.

Once server 105 queries the material database in stage 345, method 300 may continue to stage 350 where server 105 may calculate a remaining amount of material corresponding to the material package based upon the received weight and other data from the material package record found from the material database query. For example, server 105 may subtract the weight of the material package upon ingress from the previous weight of the material package and multiply this difference by the unit weight of the material to determine the amount of material used by the crew on the job. For example, if the weight of the material package before the job was 1,000 lbs., the weight of the material package after the job was 900 lbs., and the per unit weight of the material was 1 lb./ft., then the amount of material used be the crew on the job would have been 100 feet.

If the moisture content of the material package is to be considered, server 105, for example, may query the material database for the material package record to obtain: i) the per unit weight of the material on the material package; ii) the "dry" weight of the material package prior to the material being placed on the material package; iii) the previous weight of the material package before the job; and iv) the moisture content of the material package at the time when the weight of the material package before the job was taken. These factors, along with: i) the weight of the material package after the job and ii) the moisture content of the material package at the time when the weight of the material package after the job was taken, may be used to determine the amount of material used by the crew on the job when moisture content of the material package is to be considered. Table 1 below shows an example of the amount of material used by the crew on the job with the moisture content of the material package being considered. In this example, a value for the moisture weight is removed from the material package weigh before and after the job and a more accurate amount of material used by the crew on the job may be determined because the fluctuation in the moisture content of the material package before and after the job may be considered and removed.

TABLE 1

| | Material Package wt. Lbs. | "Dry" Material Package wt. Lbs. | % Moisture when weighed before and after job | Moisture Weight Lbs. | Material Package Wt. less moisture Lbs. | Per Unit Weigh of Material lbs./ft | Length Used ft. |
|---|---|---|---|---|---|---|---|
| Before job | 1000 | 100 | 20% | 20 | 980 | | |
| After job | 900 | 100 | 10% | 10 | 890 | | |
| Weight of material used considering material package moisture content. | | | | | 90 | 1 | 90 |

After server 105 calculates the remaining amount of material in stage 350, method 300 may proceed to stage 355 where server 105 may update the material package record in the material database with the calculated remaining amount of material corresponding to the material package. For example, given the previous example of the consumption of 100 feet, if the material package record in the material database previously indicated that that the material package before the job was 1,000 ft., server 105 may update the material package record in the material database with the calculated remaining amount of material comprising 900 feet. As another example, given the previous example where moisture content of the material package was considered, the consumption was 90 feet. If the material package record in the material database previously indicated that that the material package before the job was 1,000 ft., server 105 may update the material package record in the material database with the calculated remaining amount of material comprising 910 feet. Server 105 may also update the material package record in the material database with: i) the weight of the material package after the job and ii) the moisture content of the material package at the time when the weight of the material package after the job was taken. Any information from the material package record in the material database may be produced and attached to the material package. For example, each time a remaining amount of material is calculated, the value of the remaining amount of material may be printed on a label or tag and attached to the material package. Accordingly, a user may be able to see the remaining about of material on the package.

Once server 105 updates the material package record in stage 355, method 300 may then end at stage 360.

A mobile device (e.g., iPhone or Android) may be used to obtain data regarding the material package. For example, the mobile device may be able to read beacon 220 wirelessly (e.g., via Bluetooth). As a result, the mobile deice may obtain information about the material and or the material package that may be stored in the memory on beacon 220 including, for example, remaining length of material on the material package. Furthermore, the mobile device may be able to read beacon label 225 for the beacon code, transmit the beacon code to server 105, and receive information about the material and or the material package that may be stored on server 105 including, for example, remaining length of material on the material package.

Consistent with embodiments of the disclosure, a device may be placed on the material to detect the remaining amount of material in the material package without having to weigh the material package. For example, the device may be placed at the tail end of the product comprising, for example, a wire or cable. The device may "ping" the product with a signal to detect the length of the product based on the time that a reflected wave returns. The device may detect the remaining length using other processes and is not limited to the aforementioned process. The detected remaining length may be wirelessly reported, for example, to interface 135 upon return of the material package to operations area 120. The aforementioned length detecting device may be incorporated into and with beacon 220. In other words, the aforementioned length detecting device and beacon 220 may comprise one device.

Embodiments of the disclosure may provide a very granular look into the material under the control of a particular operator (e.g., a utility company). For example, the operator may control a plurality of operations areas of which operations area 120 may comprise one. Consistent with embodiments of the disclosure, the material database on server 105 may allow the operator to know the amount and type of material on every material package in every operations area controlled by the operator. For example, the operator may control a number of material packages comprising coils of 2/0 triplex service drop cable. The operator may query the material database on server 105 and learn at a particular moment in time that: i) the operator has 3,435 coils of 2/0 triplex service drop cable; ii) which operations center each coil is in; and iii) the total footage of 2/0 triplex service drop cable controlled by the operator is 515,250 feet.

Furthermore, this date may be augmented between operators in regions of a county or even on a national basis. Extending the aforementioned example, material database on server 105 may be queried to determine on a regional or national level: i) the number of coils of 2/0 triplex service drop cable; ii) which operations center each coil is in; and iii) the total footage of 2/0 triplex service drop cable on a regional or national level. This granularity of data may be useful to manufactures when determining how to determine what types of materials to manufacture. In other words, if there is a glut of 2/0 triplex service drop cable, the manufacturer may decide not to make any more for a while. Also, during a national disaster such as a hurricane, it may be useful to know where needed materials are to aid in restoration efforts.

Figure 4:
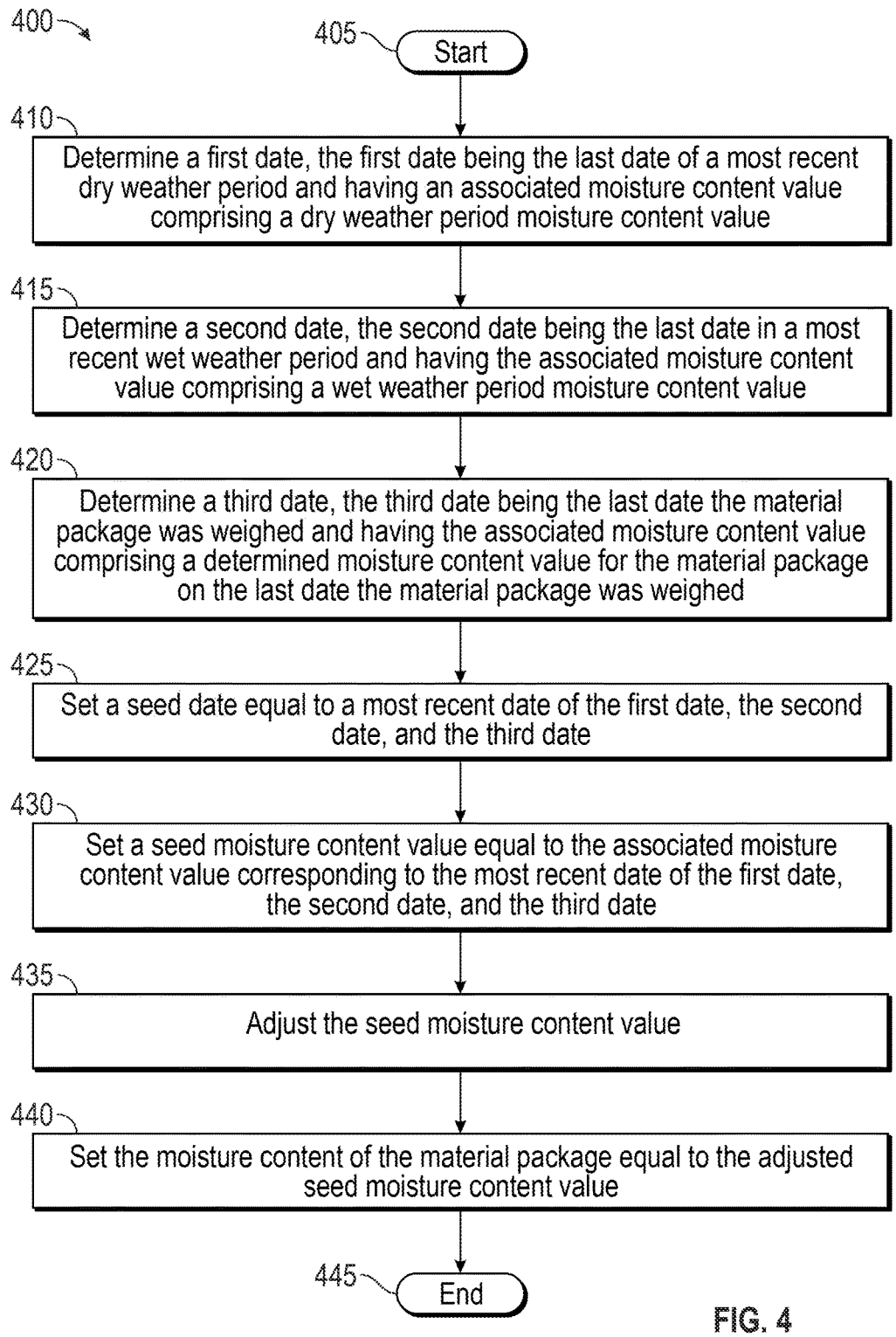
FIG. 4 is a flow chart of a method for providing moisture content of a material package in accordance with at least one example embodiment.

FIG. 4 is a flow chart setting forth the general stages involved in a method 400 consistent with an embodiment of the disclosure for providing moisture content of a material package. Method 400 may be implemented using a server 105 as described in more detail below with respect to FIG. 1. Ways to implement the stages of method 400 will be described in greater detail below.

Method 400 may use weather data for the operations area and provide this weather data to server 105. This weather data may be obtained from a source such as the National Oceanic and Atmospheric Administration (NOAA) or any other source that may maintain weather data that corresponds to the operations area. A weather device may be maintained at, near, or within the operations area. The weather device may take weather readings in order to provide the weather data to server 105.

Method 400 may begin at starting block 405 and proceed to stage 410 where server 105 may determine a first date that may be the last date of a most recent dry weather period. The first date may have an associated moisture content value comprising a dry weather period moisture content value. For example, a dry weather period may comprise a period of time (e.g., between 2 and 5 days inclusively) in which it did not rain in the area including the operations area. Within this period of time other parameter may be present in order to consider the period of time dry, for example, the temperature may have been between certain temperature values (e.g., 70 and 90 degrees Fahrenheit) and the relative humidity may have been between certain relative humidity values (e.g., 0% and 50%). Consistent with embodiments of the disclosure, the dry weather period moisture content value may comprise a baseline moisture content value that may be the equilibrium humidity value for the area including the operations during the dry weather period.

From stage 410, where server 105 determines the first date, method 400 may advance to stage 415 where server 105 may determine a second date that may comprise the last date in a most recent wet weather period. The second date may have an associated moisture content value comprising a wet weather period moisture content value. For example, a wet weather period may comprise a period of time (e.g., between 2 and 5 days inclusively) in which it rained each day in the area including the operations area in an amount greater than or equal to a rain threshold (e.g., 0.2 inches to 1.0 inches). Consistent with embodiments of the disclosure, at the end of the wet weather period, the material package may be considered saturated resulting in the wet weather period moisture content value being a saturation value (e.g., between 20% and 50%).

Once server 105 determines the second date in stage 415, method 400 may continue to stage 420 where server 105 may determine a third date that may be the last date the material package was weighed. The third date may have an associated moisture content value comprising a determined moisture content value for the material package on the last date the material package was weighed. For example, as described above, the material package may enter and leave the operations area as it is used for jobs. Each time it reenters the operations area, the material package may be weighed and a moisture content value may be obtained for the material package at the time of weighing. The third date may comprise the last day on which the material package was weighed. Accordingly, the associated moisture content value may comprise the determined moisture content value for the material package on the last date the material package was weighed. If the material package is new, it may have never been used and may not have been previously weighed at the operations area. In this case, the third date may be the date the material package arrived at the operations area from the manufacturer. The associated moisture content value associated with the third date in this case may comprise a value determined by the manufacturer that may already be in the material package record or may be given a default value.

After server 105 determines the third date in stage 420, method 400 may proceed to stage 425 where server 105 may set a seed date equal to a most recent date of the first date, the second date, and the third date. For example, if the most recent dry weather period preceded the most recent wet weather period, then the seed date may comprise the second date (e.g., the last date of the wet weather period.) If the most recent dry weather period and the most recent wet weather period preceded the date of the last time the material package was weighed, then the seed date may be the last date the material package was weighed for example.

From stage 425, where server 105 sets the seed date, method 400 may advance to stage 430 where server 105 may set a seed moisture content value equal to the associated moisture content value corresponding to the most recent date of the first date, the second date, and the third date. For example, if the seed date is the first date, then the seed moisture content value may be set at the above determined dry weather period moisture content value. If the seed date is the second date, then the seed moisture content value may be set at the above determined wet weather period moisture content value. And if the seed date is the third date, then the seed moisture content value may be set at the moisture content value for the material package on the last date the material package was weighed as obtained, for example, from the material package record in the material package database.

Once server 105 sets the seed moisture content value in stage 430, method 400 may continue to stage 435 where server 105 may adjust the seed moisture content value. For example, server 105 may iterate through, and for each day after the seed date and up to and including a current date, server 105 may check the weather data to determine if there was precipitation on each corresponding day. Server 105 may then decrease the seed moisture content value by a first predetermined amount for each day that did not have precipitation. Furthermore, server 105 may increase the seed moisture content value by a second predetermined amount for each day that had precipitation between the seed date and up to an including the current date.

After server 105 adjusts the seed moisture content value in stage 435, method 400 may proceed to stage 440 where server 105 may set the moisture content of the material package equal to the adjusted seed moisture content value. Once server 105 sets the moisture content of the material package equal to the adjusted seed moisture content value in stage 440, method 400 may then end at stage 445.

Consistent with embodiments of the disclosure, the aforementioned weather data may be considered, for example, when: i) determining the dry weather period and the associated moisture content value comprising the dry weather period moisture content value; and ii) the wet weather period and the associated moisture content value comprising the wet weather period moisture content value. Furthermore, the aforementioned weather data may be considered, for example, when adjusting the seed moisture content value. Many variables in the weather data may influence the moisture content of the material package. Any one or more of these variables may be obtained from the weather data and may be used, for example, to increment and decrement the moisture content value of the material package. These variables may influence the moisture content of the material package for a given point in time. These variables may comprise, but are not limited to, temperature for a given period, rainfall for a given period, relative humidity for a given period, average wind speed for a given period, and incident solar energy for a given period (e.g., may vary if a day is cloudy or if a day is sunny). Any one or more of these variables may be used to calculate the moisture content for the material package, for example, at any given time. Wind and solar may be used to calculate "radiation heat transfer" or "convection heat transfer". For example, "conduction" heat transfer may be influenced by temperature. These types of heat transfers may affect moisture gain or loss rates for the material package.

Figure 5:
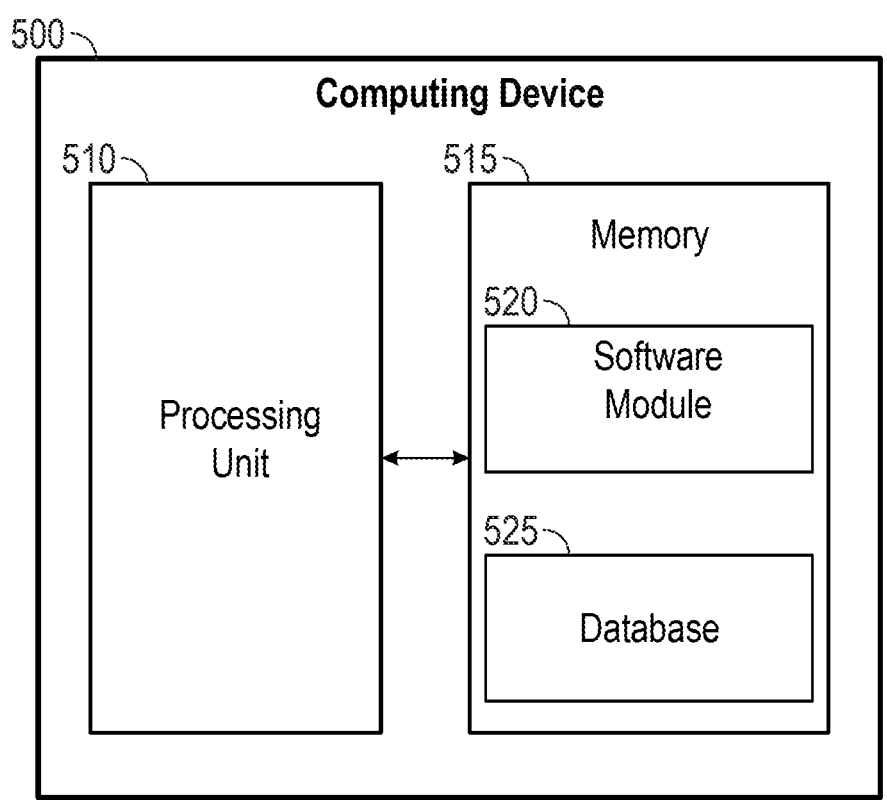
FIG. 5 is a block diagram of a computing device in accordance with at least one example embodiment.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for determining a remaining amount of material in a material package, including for example, any one or more of the stages from method 300 or method 400 described above with respect to FIG. 3 and FIG. 4 or any one or more of the stages from method 600 described below with respect to FIG. 6. Computing device 500, for example, may provide an operating environment for any one or more of server 105, staging device 125, and operations device 130. Server 105, staging device 125, and operations device 130 may operate in other environments and is not limited to computing device 500.

Computing device 500 may be implemented using a Wi-Fi access point, a cellular base station, a tablet device, a mobile device, a smart phone, a telephone, a remote control device, a set-top box, a digital video recorder, a handheld scanner, a cable modem, a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. Furthermore, computing device 500 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 500 may comprise other systems or devices.

Figure 6:
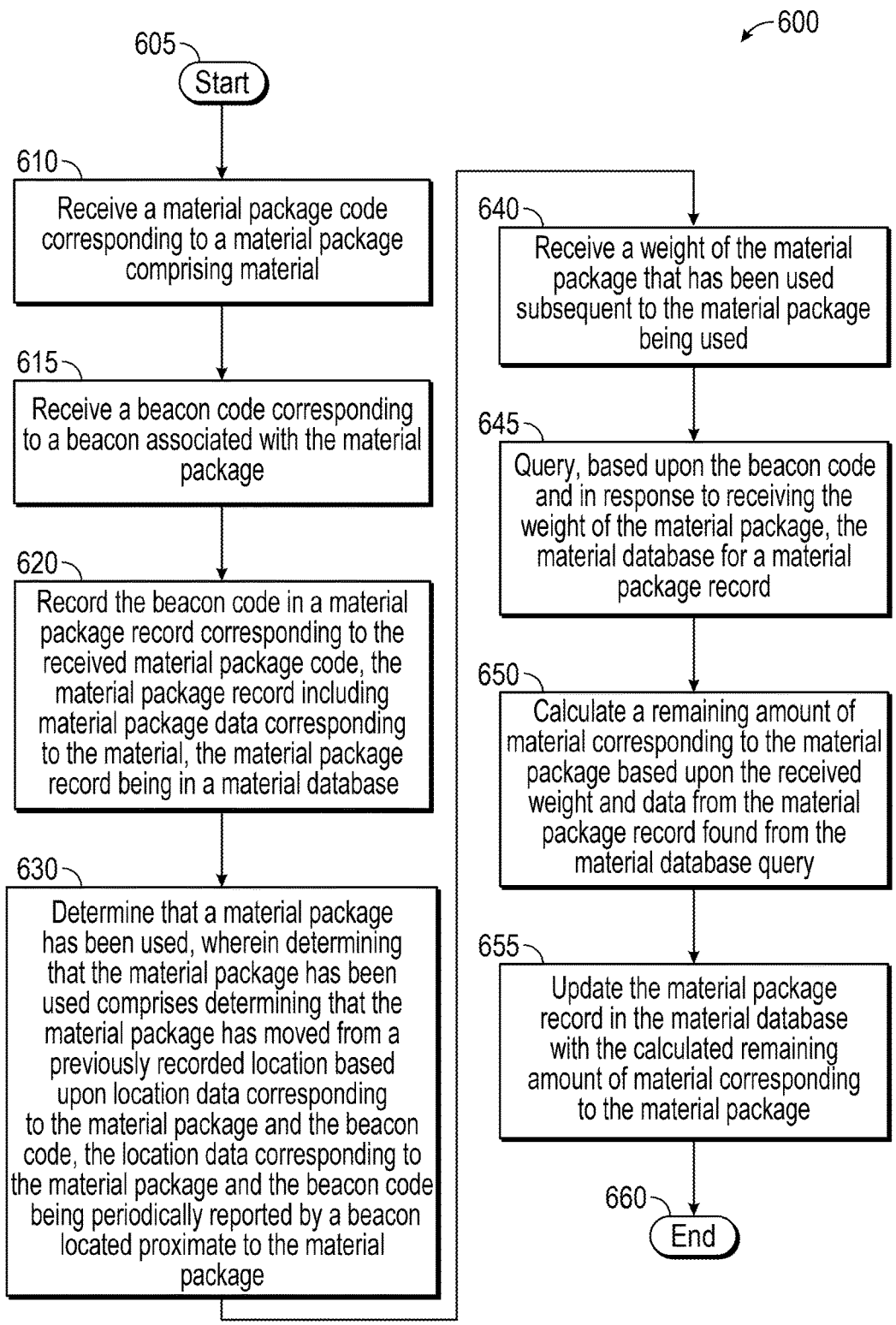
FIG. 6 is a flow chart of a method for determining a remaining amount of material in a material package in accordance with at least one example embodiment.

FIG. 6 is a flow chart setting forth the general stages involved in a method 600 consistent with an embodiment of the invention for determining a remaining amount of material in a material package. Method 600 may be implemented using, for example, server 105, staging device 125, and operations device 130, each of which may be embodied in computing device 500 as described in more detail above with respect to FIG. 5. Ways to implement the stages of method 600 will be described in greater detail below.

Advantages of the process disclosed in FIG. 6 may include, but not limited to, the automatic reporting of the material package's location and the automatic determination of the material package's use based upon the material package's periodic self-reported location. In addition, the remaining material on the material package may be updated based on the material package's weigh and moisture content subsequent to the material package's automatically detected use. This process may utilize a beacon embedded or otherwise attached to the material package. The beacon may comprise a device, for example, capable of communicating with server 105 and other devices over a Long Term Evolution Cat-M1 (LTE-M) Network for Internet of Things. The beacon may communicate with server 105 in any way and is not limited to communicating through interface 135 and operations device 130.

Method 600 may begin at starting block 605 and proceed to stage 610 where server 105 may receive a material package code corresponding to a material package comprising material. For example, the operation of stage 610 may be similar to the operation of stage 310 as described above with respect to method 300.

From stage 610, where server 105 receives the material package code corresponding to the material package comprising material, method 600 may advance to stage 615 where server 105 may receive a beacon code corresponding to a beacon associated with the material package. For example, the operation of stage 615 may be similar to the operation of stage 315 as described above with respect to method 300.

Once server 105 receives the beacon code corresponding to the beacon associated with the material package in stage 615, method 600 may continue to stage 620 where server 105 may record the beacon code in a material package record corresponding to the received material package code. For example, the operation of stage 620 may be similar to the operation of stage 320 as described above with respect to method 300.

After server 105 records the beacon code in the material package record corresponding to the received material package code in stage 620, method 600 may proceed to stage 630 where server 105 may determine that the material package has been used (e.g., has been used on a job). In determining that the material package has been used, server 105 may determine that the material package has moved from a previously recorded location (e.g., i) egressed from operations area 120 or ii) egressed from operations area 120 and has ingresses back into operations area 120) based upon location data corresponding to the material package and the beacon code. Server 105 may determine that the material package has been used based just on the material package moving from a previously recorded location (e.g., egressing from operations area 120). The location data corresponding to the material package and the beacon code may be periodically reported by the beacon located proximate to the material package. The beacon may comprise a device, for example, capable of communicating with server 105 over an LTE-M Network for Internet of Things.

For example, the beacon may be embedded or otherwise attached to the material package. The beacon may periodically report its location to server 105. When the material package comprising the beacon is stationary for a period of time, the beacon may report its location less frequently (e.g., stationary frequency). However, when the material package comprising the beacon moves, the beacon may be triggered to report its location more frequently (e.g., movement frequency). In other words, the movement frequency may be more frequent than the stationary frequency. This may be done in order to, for example, to conserve energy (e.g., battery life of the beacon). Material package movement may indicate that the material package comprising the beacon is being prepared for use on the job and therefore should report its location more frequently because it may be in transit. If the material package has not moved for a while, this may indicate that it is in storage and its location may be reported less frequently because it may be stationary. For instance, after the material package comprising the beacon is stationary for one day; the beacon may report its location daily. However, when the beacon senses movement of the material package, the beacon may be triggered to report its location hourly. The stationary frequency and the movement frequency may comprise other time periods and are not limited to daily and hourly. In order to detect the material package's movement, the beacon may be equipped with an accelerometer.

In addition to detecting and reporting the material package's location, the beacon may sense the orientation of the material package. For example, it may be important to keep some material packages in approximately a predetermined orientation. In other words, rotating some wire reels (e.g., rotating 90 degrees) may be damaging to the material (e.g., wire) on the reel. Accordingly, the beacon may periodically detect and report to server 105 the orientation or change in orientation of the material package.

In addition, to detecting its movement, the beacon may also be equipped to determine or otherwise detect its location. For example, the beacon may include a Global Positioning System (GPS) receiver and may accordingly utilize the GPS to determine its location. Furthermore, the beacon may include components that give it the ability to communicate with and over cellular telephone systems. Accordingly, the beacon may determine or otherwise detect its location from using a cellular telephone system, for example, through triangulation with a plurality of cellular telephone facilities (e.g., cellular telephone towers). In addition, the beacon may include components that give it the ability to connect wirelessly to a Wide Area Network (WAN) gateway or wirelessly to a Local Area Network (LAN) gateway, for example, via Wireless Fidelity (Wi-Fi) or Bluetooth. The gateway may be able to provide the beacon with a location of the gateway and the beacon may be able to use this provided location as an approximation of its location.

Furthermore, a crew may load the material package having the beacon on a vehicle and drive the vehicle from operations area 120 in order to go and perform the job. The vehicle may be equipped with the ability to determine the vehicle's location. The beacon on the material package may include components that give it the ability to communicate with the vehicle and determine the vehicle's location. The beacon may be able to use the vehicle's location received from the vehicle as an approximation of the material package's location. Furthermore, a member of the vehicle's crew may have a device such as a tablet device, a mobile device, a smart phone, a personal computer, or other similar microcomputer-based device. The crew member's device may be able to locate the crew member's device's location. The beacon on the material package may include components that give it the ability to communicate with the crew member's device and determine the crew member's device's location. The beacon may be able to use the crew member's device's location received from the crew member's device as an approximation of the material package's location.

From stage 630, where server 105 determines that the material package has been used (e.g., on the job), method 600 may advance to stage 640 where server 105 may receive a weight of the material package that has been used subsequent to the material package being used. For example, because the material package may have been used on the job, a portion of the material may have been removed from the material package. Because the portion of the material may have been removed from the material package, it is desirable to know how much material remains on the material package. In order to determine how much material remains on the material package, a weight of the material package subsequent to the material package being used on the job may be obtained and used to calculate the remaining material on the material package as described below.

The weight of the material package used on the job may be obtained in any way. For example, upon ingress of the material package used on the job back into operations area 120, the material package may be placed in a holding area for weighing. Once the material package has been weighed, the weight may be reported to operations device 130 that may in turn report the weight of the material package to server 105. Consistent with embodiments of the disclosure, the vehicle used to perform the job may have a device to weigh the material package subsequent to the material package being used on the job and report the weight of the material package back to server 105.

In addition to the weight of the material package, the moisture content of the material package that has been used on the job subsequent to the material package being used on the job may also be obtained and reported to server 105. For example, when the material package comprises a reel (e.g., a wooden reel), a moisture device (e.g., a moisture meter) may be used to obtain the moisture content of the reel. As stated above, the moisture meter may comprise, but is not limited to, an L600 Series Digital Recording Handheld Moisture Meter provided by Wagner Meters of 326 Pine Grove Road, Rogue River, Oreg. 97537.

The moisture content of the reel may comprise a percent moisture value. Because the amount of moisture in the material package may fluctuate over time, the weight of the material package may not only change due to material being removed, but the weight of the material package may also change due to moisture being added or taken away from the material package. The moisture device may read the percentage of moisture in the material package (e.g., reel). One moisture percentage reading may be taken or several moisture percentage readings may be taken at different location on the material package and averaged. Consistent with embodiments of the disclosure, the vehicle used to perform the job may have a device to read the moisture content of the material package subsequent to the material package being used on the job and report the moisture content to server 105.

Consistent with other embodiments of the disclosure, the moisture content value may be obtained in other ways. For example, a sample material (e.g., wood) being the same or similar to the material that the material package is made of may be kept in the same environment as the material packages in operations area 120. Rather than taking a moisture percentage reading from each material package, the moisture percentage reading of the sample may be used. Furthermore, historic moisture content values for material (e.g., wood) being the same or similar to the material that the material package is made of may be kept for operations area 120's environment. Rather than taking a moisture percentage reading of each material package, the moisture percentage historic values may be used instead. The historic values may be a function of weather and season for example. Furthermore, the moisture content value may be obtained by method 400 described above. Once the weight and the moisture content values are obtained, the material package may be placed in the general warehouse of operations area 120 for use on yet another job.

Consistent with embodiments of the disclosure, equipment (e.g., a fork truck) used to remove the material package from the vehicle for the return of the material package back into operations area 120 may have a device to weigh and read the moisture content of the material package and wirelessly report the weight and moisture content to interface 135. Consistent with other embodiments of the disclosure, the material package itself may include a device to weigh itself and report this weight back to server 105 through, for example, the beacon or through interface 135. Furthermore, the material package itself may include a device to obtain its own moisture content and report this reading back to server 105 through, for example, the beacon or through interface 135.

Once server 105 receives the weight of the material package that has been used (e.g., on the job) subsequent to the material package being used in stage 640, method 600 may continue to stage 645 where server 105 may query, based upon the beacon code and in response to receiving the weight of the material package, the material database for a material package record. For example, server 105 may query the material database for the material package record to obtain the per unit weight of the material on the material package, the previous weight of the material package before the job, and the moisture content of the material package when the previous weight was taken of the material package before the job.

After server 105 queries, based upon the beacon code and in response to receiving the weight of the material package, the material database for a material package record in stage 645, method 600 may proceed to stage 650 where server 105 may calculate a remaining amount of material corresponding to the material package based upon the received weight and other data from the material package record found from the material database query. For example, the operation of stage 650 may be similar to the operation of stage 350 as described above with respect to method 300.

From stage 650, where server 105 calculates the remaining amount of material corresponding to the material package based upon the received weight and other data from the material package record found from the material database query, method 600 may advance to stage 655 where server 105 may update the material package record in the material database with the calculated remaining amount of material corresponding to the material package. For example, the operation of stage 655 may be similar to the operation of stage 355 as described above with respect to method 300. Once server 105 updates the material package record in the material database with the calculated remaining amount of material corresponding to the material package in stage 655, method 600 may then end at stage 660.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a weight of a material package that has been used subsequent to the material package being used;
calculating a remaining amount of material corresponding to the material package based upon the received weight and a moisture content value of the material package, wherein calculating the remaining amount of material corresponding to the material package comprises obtaining the moisture content value of the material package, wherein obtaining the moisture content value comprises:
determining a first date, the first date being the last date of a most recent dry weather period for an operations area of the material package and having an associated moisture content value comprising a dry weather period moisture content value;
determining a second date, the second date being the last date in a most recent wet weather period for the operations area and having the associated moisture content value comprising a wet weather period moisture content value;
determining a third date, the third date being the last date the material package was weighed and having the associated moisture content value comprising a determined moisture content value for the material package on the last date the material package was weighed;
setting a seed date equal to a most recent date of the first date, the second date, and the third date;
setting a seed moisture content value equal to the associated moisture content value corresponding to the most recent date of the first date, the second date, and the third date;
adjusting the seed moisture content value, wherein adjusting the seed moisture content value comprises:
decreasing the seed moisture content value by a first predetermined amount for each day that had precipitation for the operations area between the seed date and a current date, and
increasing the seed moisture content value by a second predetermined amount for each day that had precipitation between the seed date and the current date; and
setting the moisture content value of the material package equal to the adjusted seed moisture content value; and
updating a material package record with the calculated remaining amount of material corresponding to the material package.

2. The method of claim 1, further comprising determining that the material package has been used in response to determining that the material package has ingressed back into an operations area.

3. The method of claim 2, wherein determining that the material package has been used comprises determining that the material package has been used wherein the material package comprises a wooden wire reel.

4. The method of claim 2, wherein determining that the material package has been used comprises determining that the material package has been used wherein the material package comprises a reel-less package.

5. The method of claim 2, wherein determining that the material package has been used comprises determining that the material package has been used wherein the material package comprises material comprising one of the following: electrical cable, electrical wire, and flexible conduit.

6. The method of claim 2, wherein determining that the material package has been used comprises determining that the material package has been used wherein the material package comprises material comprising a long continuous flexible material capable of being wound on a reel.

7. The method of claim 1, further comprising saving the material package record in a memory in a beacon.

8. The method of claim 1, wherein obtaining the moisture content value comprises obtaining the moisture content value using a moisture meter.

9. The method of claim 1, further comprising:
receiving a material package code corresponding to the material package;
receiving a beacon code corresponding to a beacon associated with the material package;
recording the beacon code in the material package record corresponding to the received material package code, the material package record including material package data corresponding to the material, the material package record being in a material database; and
updating location data in the material package record when the material package enters the operations area for the first time.

10. The method of claim 9, further comprising querying for the material package record in a material database.

11. The method of claim 1, further comprising determining that that material package has been used, wherein determining that the material package has been used comprises determining that the material package has moved from a previously recorded location based upon location data corresponding to the material package and a beacon code, the location data corresponding to the material package and the beacon code being periodically reported by a beacon located proximate to the material package.

12. A system comprising:
a memory storage; and
a processing unit coupled to the memory storage, wherein the processing unit is operative to:
receive a weight of a material package that has been used subsequent to the material package being used;
calculate a remaining amount of material corresponding to the material package based upon the received weight and a moisture content value of the material package, wherein the processing unit being operative to calculate the remaining amount of material corresponding to the material package comprises the processing unit being operative to obtain the moisture content value of the material package, wherein the processing unit being operative to obtain the moisture content value comprises the processing unit being operative to:
determine a first date, the first date being the last date of a most recent dry weather period for an operations area of the material package and having an associated moisture content value comprising a dry weather period moisture content value;
determine a second date, the second date being the last date in a most recent wet weather period for the operations area and having the associated moisture content value comprising a wet weather period moisture content value;
determine a third date, the third date being the last date the material package was weighed and having the associated moisture content value comprising a determined moisture content value for the material package on the last date the material package was weighed;
set a seed date equal to a most recent date of the first date, the second date, and the third date;
set a seed moisture content value equal to the associated moisture content value corresponding to the most recent date of the first date, the second date, and the third date;
adjust the seed moisture content value, wherein the processing unit being operative to adjust the seed moisture content value comprises the processing unit being operative to:
decrease the seed moisture content value by a first predetermined amount for each day that had precipitation for the operations area between the seed date and a current date, and
increase the seed moisture content value by a second predetermined amount for each day that had precipitation between the seed date and the current date; and
set the moisture content value of the material package equal to the adjusted seed moisture content value; and
update a material package record with the calculated remaining amount of material corresponding to the material package.

13. The system of claim 12, wherein the processing unit is further operative to save the material package record in a memory in a beacon.

14. The system of claim 12, wherein the moisture content value is obtained using a moisture meter.

15. The system of claim 12, wherein the processing unit is further operative to:
receive a material package code corresponding to the material package;
receive a beacon code corresponding to a beacon associated with the material package;
record the beacon code in the material package record corresponding to the received material package code, the material package record including material package data corresponding to the material, the material package record being in a material database; and
update location data in the material package record when the material package enters the operations area for the first time.

16. The system of claim 12, wherein the processing unit being operative to query for the material package record in a material database.

17. A computer-readable medium that stores a set of instructions which when executed perform a method comprising:
receiving a weight of a material package that has been used subsequent to the material package being used;
calculating a remaining amount of material corresponding to the material package based upon the received weight and a moisture content value of the material package, wherein calculating the remaining amount of material corresponding to the material package comprises obtaining the moisture content value of the material package, wherein obtaining the moisture content value comprises:
determining a first date, the first date being the last date of a most recent dry weather period for an operations area of the material package and having an associated moisture content value comprising a dry weather period moisture content value;
determining a second date, the second date being the last date in a most recent wet weather period for the operations area and having the associated moisture content value comprising a wet weather period moisture content value;

determining a third date, the third date being the last date the material package was weighed and having the associated moisture content value comprising a determined moisture content value for the material package on the last date the material package was weighed;

setting a seed date equal to a most recent date of the first date, the second date, and the third date;

setting a seed moisture content value equal to the associated moisture content value corresponding to the most recent date of the first date, the second date, and the third date;

adjusting the seed moisture content value wherein adjusting the seed moisture content value comprises:

decreasing the seed moisture content value by a first predetermined amount for each day that had precipitation for the operations area between the seed date and a current date, and increasing the seed moisture content value by a second predetermined amount for each day that had precipitation between the seed date and the current date; and setting the moisture content value of the material package equal to the adjusted seed moisture content value; and updating a material package record with the calculated remaining amount of material corresponding to the material package.

18. The computer-readable medium of claim 17, further comprising:

receiving a material package code corresponding to the material package;

receiving a beacon code corresponding to a beacon associated with the material package;

recording the beacon code in the material package record corresponding to the received material package code, the material package record including material package data corresponding to the material, the material package record being in a material database; and updating location data in the material package record when the material package enters the operations area for the first time.

19. The non-transitory computer readable medium of claim 17, further comprising determining that the material package has ingressed back into the operations area.

20. The non-transitory computer readable medium of claim 17, wherein the material package comprises at least one of the following: a wooden wire reel and a reel-less package.

21. The non-transitory computer readable medium of claim 17, wherein the material package comprises material comprising one of the following: electrical cable, electrical wire, flexible conduit, and a long continuous flexible material capable of being wound on a reel.

\* \* \* \* \*